United States Patent
Furuichi et al.

(10) Patent No.: US 7,037,000 B2
(45) Date of Patent: May 2, 2006

(54) OPTICAL TRANSMISSION MODULE

(75) Inventors: Hiroaki Furuichi, Yokohama (JP);
Hiroyasu Sasaki, Yokohama (JP);
Kazumi Kawamoto, Yokohama (JP)

(73) Assignee: OpNext Japan, Inc., Yokohama (JP)

(*) Notice: Subject to any disclaimer, the term of this patent is extended or adjusted under 35 U.S.C. 154(b) by 63 days.

(21) Appl. No.: 10/631,389

(22) Filed: Jul. 30, 2003

(65) Prior Publication Data
US 2004/0114883 A1 Jun. 17, 2004

(30) Foreign Application Priority Data
Oct. 18, 2002 (JP) ............................... 2002-304040

(51) Int. Cl.
*G02B 6/32* (2006.01)
*G02B 6/36* (2006.01)

(52) U.S. Cl. .............................. 385/93; 385/33; 385/34; 385/35; 385/88; 385/92

(58) Field of Classification Search ............. 385/88–94
See application file for complete search history.

(56) References Cited

U.S. PATENT DOCUMENTS

| 5,751,878 | A | | 5/1998 | Kyoya | |
| 5,801,892 | A | * | 9/1998 | Naganuma et al. | 359/892 |
| 5,949,939 | A | | 9/1999 | Kyoya | |
| 6,793,412 | B1 | * | 9/2004 | Nishita | 385/93 |
| 6,799,901 | B1 | * | 10/2004 | Yoshimura et al. | 385/88 |
| 2004/0141697 | A1 | * | 7/2004 | Hubner | 385/92 |

FOREIGN PATENT DOCUMENTS

JP 2001-066468 3/2001

* cited by examiner

*Primary Examiner*—Michelle Connelly-Cushwa
*Assistant Examiner*—Tina M Wong

(74) *Attorney, Agent, or Firm*—Townsend and Townsend and Crew LLP

(57) ABSTRACT

The present invention provides an optical transmission module comprising: a laser diode; a lens for condensing a laser beam from the laser diode; a fiber ferrule which is placed so that the laser beam condensed by the lens can enter a fiber core; and a lens aperture or a lens aperture portion which is provided at one of the lens itself, a position before the lens and a position after the lens.

In addition, the present invention provides an optical transmission module in which instead of the lens aperture, an effective diameter of the lens on the fiber ferrule side is set at a value ranging from 0.1 times to less than 0.2 times of a distance between an emittance plane of the lens and an incidence plane of the fiber ferrule.

6 Claims, 7 Drawing Sheets

OPTICAL TRANSMISSION MODULE

BACKGROUND OF THE INVENTION

The present invention relates to a technique for improving temperature characteristics of an optical transmission module. In particular, the technique can be suitably applied to a can type optical module.

In an optical communication module that uses an optical fiber, a laser diode (hereinafter abbreviated as LD) which is a luminous element, and a photodiode (hereinafter abbreviated as PD) which is a light receiving element, are accommodated in various kinds of packages from the view point of reliability. Among the packages, there is a can type package that can easily have a coaxial structure with an optical fiber. This can package is often used as a receptacle type optical transmission module, into which an optical fiber is inserted, and from which the optical fiber is removed (for example, refer to Japanese Patent Laid-Open No. 2001-66468).

SUMMARY OF THE INVENTION

In recent years, miniaturization and speedup of an optical transmission module (or optical transceiver) into which a transmission module having a built-in LD, a receiver module having a built-in PD, and an electric-signal control IC are integrated are progressing. A receptacle type optical module is often used for a small-sized optical transmission module in order to provide an optical connector with a structure where an optical fiber can be inserted and removed. The above-mentioned can type optical module is often used at a communication speed of 2.5 Gbit/s or less.

On the other hand, in order to achieve speedup to 10 Gbit/s or more, it is desirable that the optical module has a built-in driver IC for LD in the case of the transmission module, and a built-in preamplifier IC for PD in the case of the receiver module. For this reason, it is difficult to include the built-in driver IC and the built-in preamplifier IC in a can, a size of which is equivalent to that of the conventional optical module used at a communication speed of 2.5 Gbit/s or less. It is necessary to increase a diameter, and a length, of the can to accommodate them.

In addition, because the can type optical module has a structure in which a metal holder with a lens is joined to a substrate on which an optical element is mounted, a diameter, and a length, of the can become large. If the diameter, and the length, of the can become large, an interval between the optical element and the lens varies more easily due to thermal expansion, which produces a problem that fluctuations in light power tend to become larger.

Moreover, also in a butterfly-type optical module having terminals on some sides of a case, a similar problem arises although there is a difference in extent.

An object of the present invention is to provide a technique whereby in an optical transmission module having a transmission module and a receiver module, even if a size becomes large as a result of including a built-in driver IC and a built-in preamplifier IC, fluctuations in light power caused by thermal expansion can be suppressed.

According to one aspect of the present invention, there is provided an optical transmission module, said optical transmission module comprising: a laser diode for emitting a laser beam; a lens for condensing the laser beam; a fiber ferrule having a fiber core into which the laser beam emitted from the lens enters; and a lens aperture or a lens aperture portion being provided at one of the lens itself, a position before the lens and a position after the lens, wherein: an interval between the laser diode and the lens fluctuates with temperature, which prevents the coupling efficiency with the fiber ferrule from degrading.

According to another aspect of the present invention, there is provided an optical transmission module, said optical transmission module comprising: a base; a laser diode mounted on a substrate secured to the base; a lens holder having a lens for condensing the laser beam, said lens holder being secured to the base; a fiber ferrule having a fiber core into which the laser beam emitted from the lens enters; and a lens aperture or a lens aperture portion being provided at one of the lens itself, a position before the lens and a position after the lens, wherein: an interval between the laser diode and the lens fluctuates with temperature, which prevents the coupling efficiency with the fiber ferrule from degrading.

DETAILED DESCRIPTION OF THE PREFERRED EMBODIMENT

Embodiments according to the present invention will be described using some examples with reference to drawings as below.

Among optical modules, in particular, a can type optical module has a structure in which a metal holder with a lens is joined to a metal substrate on which an optical element is mounted. Therefore, if a size becomes larger, an interval between the optical element and the lens varies more easily due to thermal expansion. Additionally, as a result of this tendency, a problem of fluctuations in light power which becomes larger is produced. An embodiment of a structure by which this problem is solved will be described with reference to FIGS. 1 and 2.

It is to be noted that if the can type optical module is said in other words, it can be expressed "in-axis geometry" in a broad sense. The in-axis geometry is a structure in which a lens and an optical fiber are laid one by one on an optical element, which is mounted on a can package having a coaxial shape, in an optical axis direction so that the lens and the optical fiber are secured.

Figure 1:
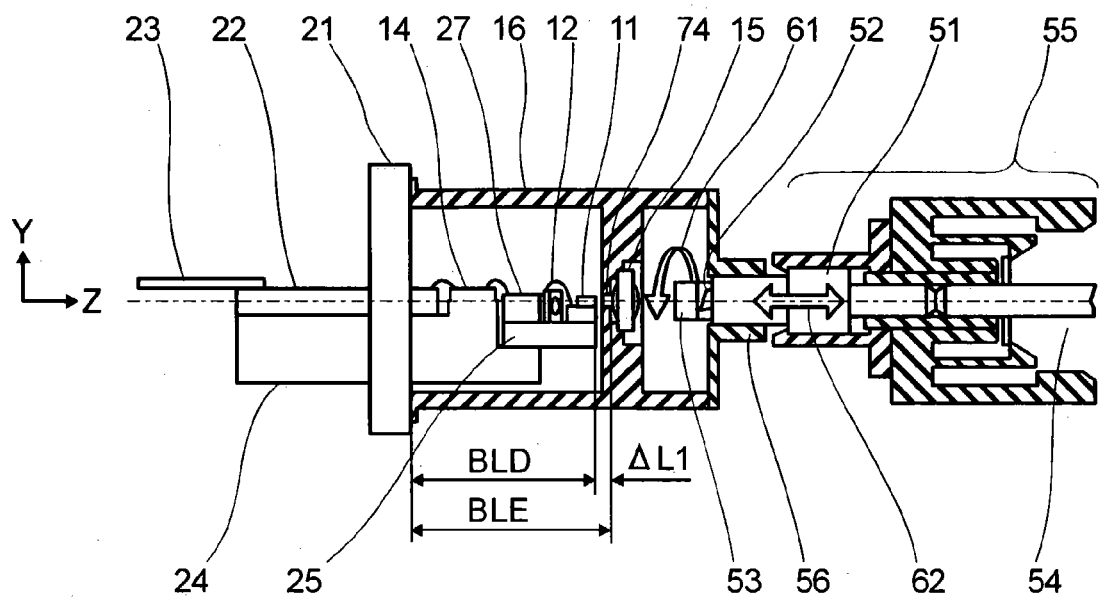
FIG. 1 is a fragmentary sectional side view illustrating a first embodiment of a can type optical module according to the present invention.
Figure 2:
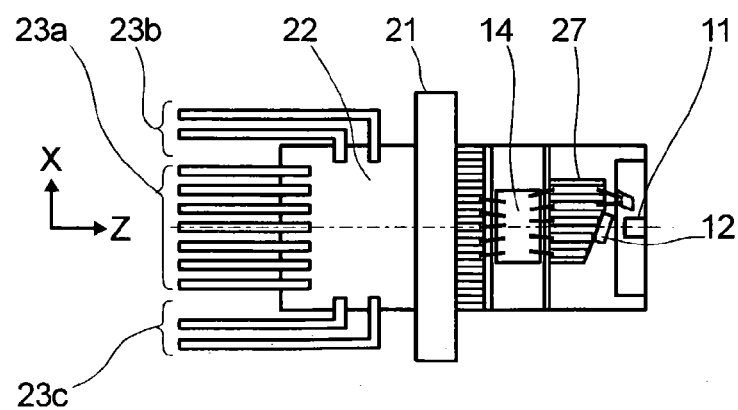
FIG. 2 is a plan view illustrating inside of the can, which focuses on a LD substrate shown in FIG. 1.

FIG. 1 is a fragmentary sectional side view illustrating a first embodiment of a can type optical module according to the present invention. FIG. 2 is a plan view illustrating the inside of the can, which focuses on a LD substrate shown in FIG. 1.

As shown in FIGS. 1 and 2, a main substrate 25 is connected (mounted) to the edges of a printed circuit board 22 and a radiant heat board 24, which penetrate a base 21. A semiconductor laser diode (LD) 11, a monitor photodiode (monitor PD) 12 mounted on a sub-mount relay substrate 27, and the like, are soldered to this main substrate 25. A driver IC 14 is soldered to the radiant heat board 24. In addition, a flat lead terminal 23 is connected to the other end of the printed circuit board 22 that penetrates the base 21. As for the flat lead terminal 23, mainly high-frequency signal use lead terminals 23a are connected to the rear end along an optical axis. If the number of the lead terminals is not enough, bent lead terminals 23b, 23c which are bent are connected also from the sides of the printed circuit board 22 so as to take the same optical axis direction as that of the high-frequency signal use lead terminal 23a.

Here, the relationship between the LD 11 and the monitor PD 12 mounted on the main substrate 25 will be described. The monitor PD 12 is mounted on the sub-mount relay substrate 27 located in a rearward position of the LD 11 in such a manner that a light receiving surface substantially faces a Z-axis direction. Because backward light of the LD 11 is directly inputted into the monitor PD 12, the sufficient quantity of incident light is secured. In this connection, a reason why the monitor PD 12 does not completely face the Z-axis direction but slants slightly to a X-axis direction is that the slant prevents reflected light from a surface of the monitor PD 12 from returning to the LD 11. Here, an X-axis surface of the sub-mount relay substrate 27 is provided with a structure having impedance matched wiring lines. This enables short distance connection with a high frequency property from the LD 11 to the driver IC 14, making it possible to reduce a mount area. Further, because the driver IC 14 is directly connected on the radiant heat board 24, excellent heat dispersion characteristics are also ensured.

As described above, the main substrate 25 on which the LD 11 is mounted is connected to the edge of the radiant heat board 24, with the result that the main substrate 25 is secured to the base 21 through the radiant heat board 24. Accordingly, the LD 11 is mounted to the main substrate 25 secured to the base 21. The can type optical module has a structure in which a metal holder 16 with a lens 15 is joined to a metal substrate 21 which is a base secured by the radiant heat board 24 including the main substrate 25 on which the LD 11 is mounted and by the printed circuit board 22 secured on the radiant heat board 24. The radiant heat board 24 and the printed circuit board 22 penetrate the metal substrate 21. The can type optical module is configured by laying the lens 15 and an optical fiber 52 one by one, in the optical axis direction, for the optical element 11 in the metal holder 16 with the lens.

In addition, reference numeral 74 is a lens aperture unit provided according to the present invention, and its detail will be described later.

Moreover, a can type lens holder 16 on which the lens 15 is mounted beforehand is aligned with the LD 11 before using welding, etc. to secure the can type lens holder 16 to the base 21 through which the printed circuit board 22 and the radiant heat board 24 penetrate. A fiber ferrule 51 inserted into a fiber guide 56 is aligned with the can type lens holder 16 in XYZ directions, and is then secured by YAG welding, etc. Lastly, a receptacle section 55 is mounted to the fiber ferrule 51. As a result, a receptacle optical module is completed. When adjusting an optical output and actually using the optical output, a removable optical fiber ferrule 54 is inserted into the receptacle section 55. In this state, the optical output can be obtained.

It should be noted that in general, an optical module into which the driver IC 14 is built to directly perform modulation has a strong tendency to be provided with an increased driving electric current for the LD 11 so as to improve the high-frequency response, in other words, so as to make an aperture of an eye of a light wave form as large as possible. As a result of it, the LD 11 often has sufficient light-emitting power as compared with that prescribed in the standards of the quantity of light output from an optical fiber. Hence, as a method for attenuating and adjusting the quantity of light inputted into an optical fiber, the following method can be applied: adjusting the quantity of light entered into the fiber ferrule 51 by rotating an isolator 53 right and left as indicated by an arrow 61; and moving the whole fiber ferrule 51 backward and forward in the optical axis direction as indicated by an arrow 62, and thereby defocusing is performed for adjustment.

Next, image formation in a one-lens system as shown in FIG. 1 will be described with reference to FIG. 3.

Figure 3:
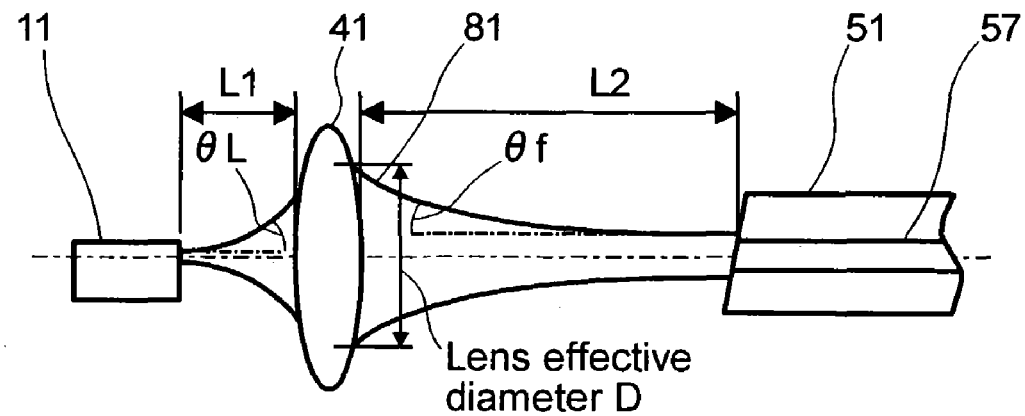
FIG. 3, is a schematic diagram illustrating a one-lens optical coupling system as shown in FIG. 1.

FIG. 3 is a schematic diagram illustrating a one-lens optical coupling system as shown in FIG. 1. It is to be noted that in the figures described below, the same parts are designated by similar reference numerals, therefore their description will be omitted.

In general, a spot diameter of the LD 11 is a little less than 2 micron. In the case of a single-mode fiber, a mode field diameter of a fiber core 57 is about 8 through 10 micron. Therefore, in a lens system, the coupling efficiency of which is optimized, its image magnification often ranges from 4 to 6 times. To be more specific, on the assumption that a distance between the LD 11 and a lens 41 which is a schematic expression of the lens 15 is L1, and that a distance between the lens 41 and an incidence plane of the fiber ferrule 51 is L2, a distance L2 between the lens 41 and the fiber ferrule 51 becomes 4 to 6 times of L1. In general, a numerical aperture NA of the single-mode fiber is about 0.1. It is so devised that a numerical aperture of the lens 41 on the fiber side becomes about 0.1. As a result of it, judging from the above-mentioned image magnification, it is desirable to design a numerical aperture of the lens 41 on the LD side to be 0.4 through 0.6. In the case of a spherical lens, the numerical aperture as described above may not be obtained due to the aberration of the lens. However, in the case of an aspherical lens, which is normally on the market, and the lens aberration of which is corrected, it is in general so devised that the numerical aperture as described above can be obtained. In this connection, as shown in FIG. 3, on the assumption that an emitting angle of a laser beam emitted from the LD 11 is θL, and that an angle made when a laser beam emitted from the lens 41 is entered in an incidence plane of the fiber ferrule 51 is θf, a numerical aperture NA of the lens on the LD side=sin θL, and a numerical aperture NA of the lens on the fiber side=sin θf according to the prescription. On the assumption that an effective diameter of the lens on the fiber side is D, a numerical aperture NA of the lens on the fiber side is about 0.1. Accordingly, it is possible to express it approximately as NA=sin θf≈tan θf=(D/2)/L2.

Next, a state in which the whole optical module is used at a temperature higher than a room temperature will be described. In general, taking joinability of welding, etc. into consideration, the lens holder 16 is often made of metal such as stainless steel, and therefore its thermal expansion coefficient is about 10 through 20 ppm/° C. On the other hand, the printed circuit board 22 and the main substrate 25 form wiring lines with a ceramic material, and its thermal expansion coefficient is about 4 through 8 ppm/° C. The radiant heat board 24 is made of metal such as Cu and W, a thermal expansion coefficient of which is substantially coincident with that of the printed circuit board 22, and which has excellent heat dispersion characteristics. As described above, it is difficult to configure the lens holder 16 and the substrate by use of materials, thermal expansion coefficients of which are close to each other. Consequently, if it is used at a temperature higher than a room temperature, as for the lens holder 16, a thermal expansion coefficient of which is relatively high, a BLE part shown in FIG. 1 expands, whereas as for the printed circuit board 22 and the main substrate 25, thermal expansion coefficients of which are relatively low, a BLD part shown in FIG. 1 expands. This causes a distance between the LD 11 and the lens 15 to increase only by ΔL1, which is the difference between both of the expansion. This state is schematically illustrated in FIG. 4.

Figure 4:
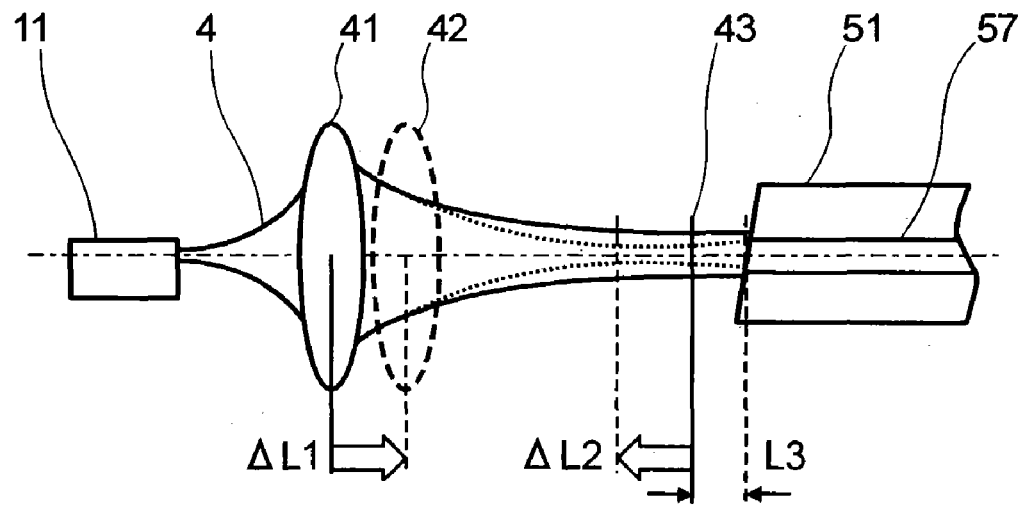
FIG. 4 is a schematic diagram illustrating a move of a lens in response to a temperature in the one-lens optical coupling system shown in FIG. 1.

FIG. 4 is a schematic diagram illustrating a move of a lens in response to a temperature in the optical coupling system substantially having one lens shown in FIG. 1. As described above, when the temperature increases, the lens 41 moves to the right side, that is to say, toward the fiber ferrule 51, only by ΔL1; this state is illustrated as a lens 42 in the figure. As a result of the move of the lens 41 only by ΔL1 toward the fiber ferrule 51, a beam waist 43 on the fiber ferrule 51 side moves toward the lens only by ΔL2. As described above, in many cases, an image magnification of the lens as an optical system ranges from 4 to 6 times. ΔL2 becomes the square of (an optical magnification) of ΔL1. Accordingly, even if ΔL1 is a little less than 1 or 2 micron, ΔL2 fluctuates within a range of about 16 through 50 micron, causing large fluctuations in optical coupling efficiency.

Figure 5:
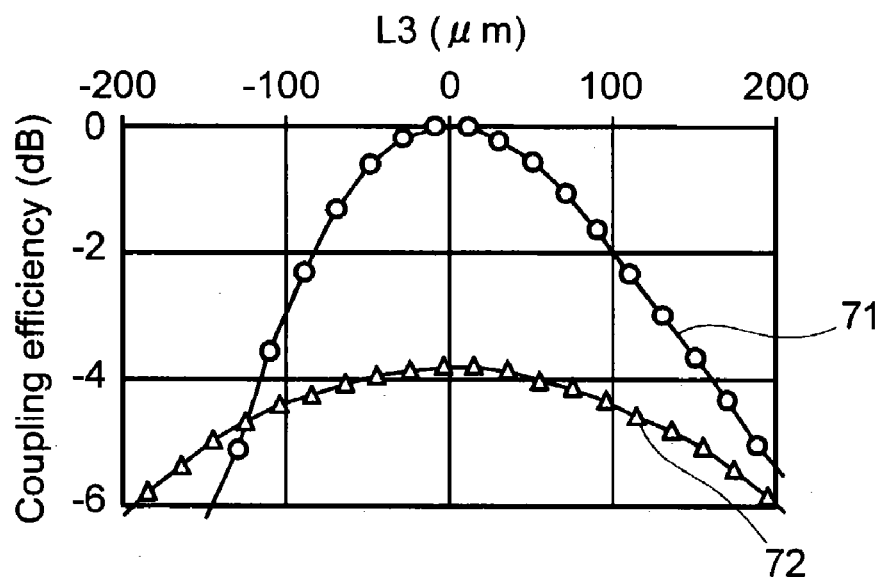
FIG. 5 is a property diagram illustrating a change in coupling efficiency versus a change in position of a beam waist.

FIG. 5 is a property diagram illustrating a change in coupling efficiency versus a change in position of a beam waist. A horizontal axis indicates a distance L3 (μm) from an incidence plane of the fiber ferrule to the beam waist 43, in other words, the quantity of defocusing described above. A vertical axis indicates coupling efficiency (dB). When a temperature increases, the beam waist 43 moves to the left side in FIG. 4. In contrast with this, when the temperature decreases, the beam waist 43 moves to the right side.

In FIG. 5, a curve 71 indicates the coupling efficiency (dB) for the distance L3 (μm) from an incidence plane of the fiber ferrule 51 to the beam waist 43 for a case where the lens aperture unit 74 does not exist in FIG. 1. When a temperature becomes higher than a normal temperature, it is possible to find a change in coupling efficiency produced when ΔL2 fluctuates by about 16 through 50 micron. For example, as described above, if the quantity of incident light is adjusted by rotation 61 of the isolator 53, when the beam waist 43 is in an incidence plane of the fiber ferrule 51, in other words, when L3 is 0 micron, fluctuations of L3 by about 50 micron at the maximum cause the coupling efficiency to fluctuate by about a little less than 0.5 dB. In addition, as shown by an arrow 62, if the whole fiber ferrule 51 is moved in an optical axis direction to make an adjustment by defocusing, when defocusing by −2 dB is provided at the time of assembling (in other words, defocusing is provided so that L3 becomes about +100 μm), fluctuations of about 50 micron at the maximum are equivalent to fluctuations of about 1.5 dB.

In this connection, a curve 72 indicates the coupling efficiency for a case where a lens aperture is provided on an incidence plane of the lens 41, which will be described later.

As described above, the fluctuations ΔL2 cause the quantity of light to fluctuate to a large extent. To be more specific, as a result of a rise in temperature, the quantity of incident light entered in the incidence plane of the fiber ferrule 51 fluctuates, causing the optical coupling efficiency to fluctuate.

For this reason, with reference to FIG. 6, a method for avoiding fluctuations of the optical coupling efficiency by adding the lens aperture 73 in front of the lens 41 will be described.

Figure 6:
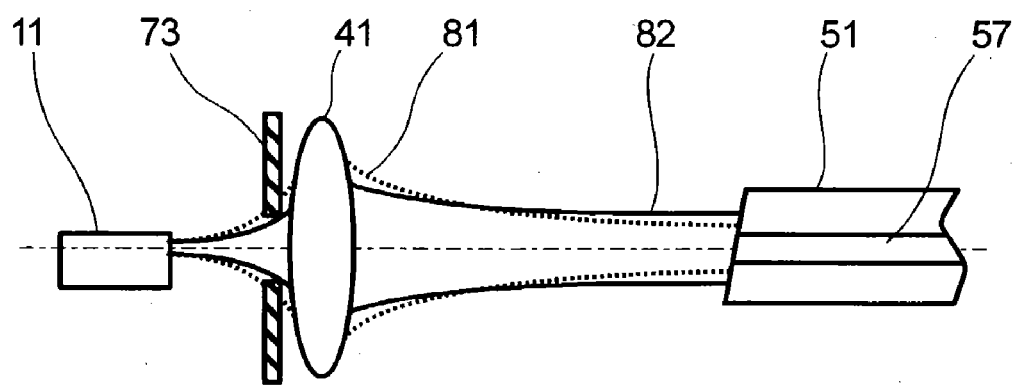
FIG. 6 is a schematic diagram illustrating an optical system in which a lens aperture is formed in front of a lens.

FIG. 6 is a schematic diagram illustrating an optical system in which a lens aperture is formed in front of a lens. In FIG. 6, a beam profile 81 obtained when there is no lens aperture, which is shown by broken lines, is determined according to a numerical aperture NA of the lens 41. On the other hand, a beam profile 82 obtained when there is a lens aperture 73, which is shown by solid lines, is determined by a hole diameter of the lens aperture 73. With decrease in numerical aperture NA of the lens 41 a diffraction limit becomes worse, and consequently a beam waist diameter grows larger. In other words, the beam profile 82 becomes waistless to some extent, reducing a change in beam diameter in a Z direction shown in FIG. 1.

Accordingly, as is the case with the curve 72 in FIG. 5, providing the incidence plane of the lens 41 with the lens aperture 73 reduces fluctuations in quantity of light caused by fluctuations ΔL2 of the beam waist 43, making it possible to reduce fluctuations in optical coupling efficiency.

Next, a size of the lens aperture 73, and accuracy of position for the lens 15, will be described.

Figure 7:
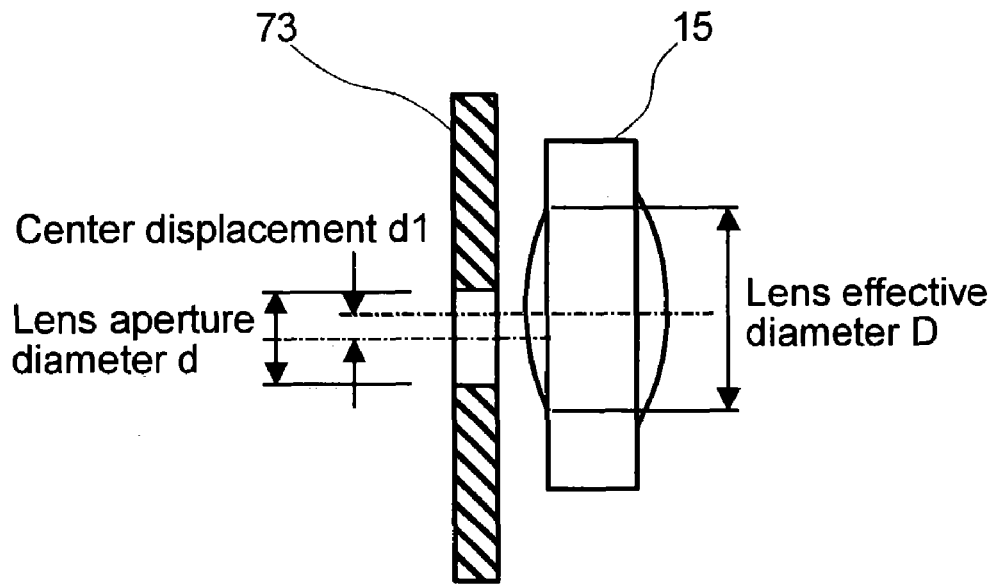
FIG. 7 is a fragmentary sectional side view illustrating a lens and a lens aperture.

FIG. 7 is a fragmentary sectional side view of the lens 15 and the lens aperture 73, which shows a case where displacement of the lens aperture 73 relative to the lens 15 occurs. As shown in FIG. 7, a lens effective diameter of the lens 15 on the LD side (where the lens aperture 73 exists) is D; a hole diameter of the lens aperture 73 is d; and displacement of a center of the lens aperture 73 relative to a center of the lens 15 is d1.

Figure 8:
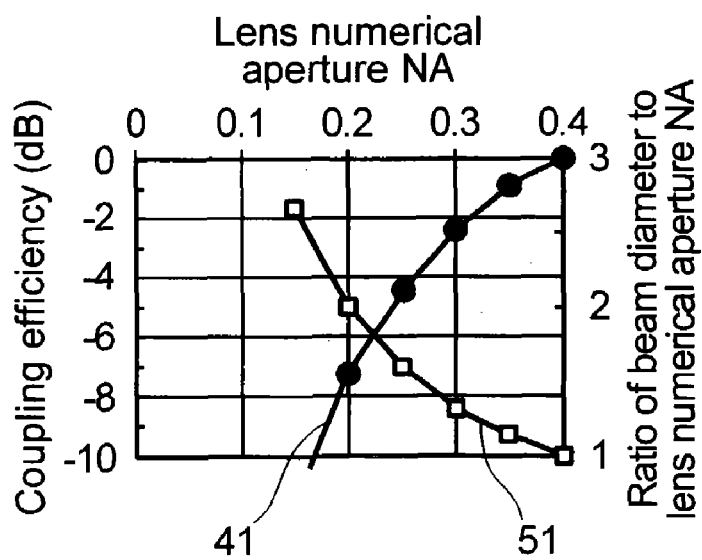
FIG. 8 is a property diagram illustrating the coupling efficiency, and a beam diameter ratio, versus a lens numerical aperture NA.

FIG. 8 is a property diagram illustrating the coupling efficiency, and a beam diameter ratio, versus a lens numerical aperture NA. In the figure, a horizontal axis indicates the lens numerical aperture NA, a first vertical axis indicates the coupling efficiency, and a second vertical axis indicates the beam diameter ratio. The beam diameter ratio is determined as below. If a beam diameter of the beam waist 43 without the lens aperture 73 is 1 and a diameter of the beam waist 43 with the lens aperture 73 is r, a beam diameter ratio is r.

In FIG. 8, a curve 41 shows the coupling efficiency obtained when the lens aperture 73 is added to make the numerical aperture small on the assumption that a numerical aperture of the lens 15 on the LD side is 0.4. A curve 51 shows a beam diameter ratio. If a diameter of the lens aperture 73 is made small to reduce a numerical aperture, the coupling efficiency decreases. However, a beam diameter can be made larger as compared with the case where there is no lens aperture. However, an extreme decrease in coupling efficiency as a result of adding the lens aperture 73 should be avoided; its limit is considered to be about −5 to −7 dB. In this case, a lens numerical aperture on the LD side is 0.2 or more, and a magnification ratio of the beam diameter is 2 times or less. A lens numerical aperture on the fiber ferrule side obtained when there is no lens aperture is 0.1, and a numerical aperture obtained when the lens aperture 73 is added becomes 0.05 or more. To be more specific, the addition of the lens aperture 73 permits a numerical aperture NA on the fiber ferrule side of the lens 15 to range from 0.05 to less than 0.1.

In reality, it depends on the attenuation of the coupling efficiency. However, a desirable lens numerical aperture by which a beam diameter can magnify without extremely decreasing the coupling efficiency is considered to be about 0.25 through 0.35. In other words, if the lens aperture 73 is placed at a position in proximity to the lens 15, a hole diameter d of the lens aperture should be set at 0.25/0.4 through 0.35/0.4 of the lens effective diameter D, that is to say, at about 63 through 88%. In this case, a lens numerical aperture on the fiber side should be set at about 0.063 through 0.088.

Next, the displacement between the centers of the lens 15 and the lens aperture 73 will be described with reference to FIGS. 7 and 9.

Figure 9:
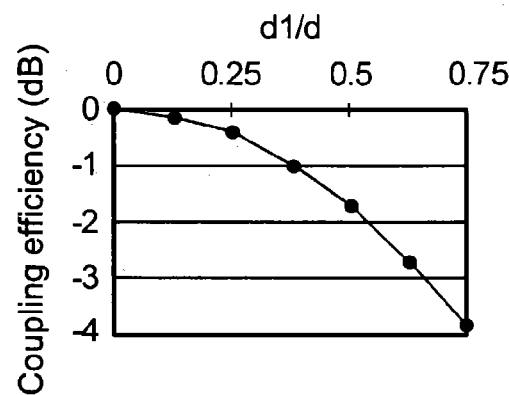
FIG. 9 is a property diagram illustrating the coupling efficiency obtained when the center of the lens aperture is displaced from the center of the lens.

FIG. 9 is a property diagram illustrating the coupling efficiency obtained when the center (light axis) of the lens aperture 73 is displaced from the center (light axis) of the lens 15. On the assumption that the displacement between the centers of lens aperture 73 and the lens 15 is d1 and a diameter of the lens aperture 73 is d, a horizontal axis indicates d1/d. A vertical axis indicates the coupling efficiency (dB). As shown in FIG. 7, if the displacement between the center of the lens 15 and the center of a lens aperture is specified, FIG. 9 plots the coupling efficiency versus a ratio of the amount of the center displacement d1 to the lens aperture diameter d (that is to say, d1/d). An extreme decrease in coupling efficiency should be avoided. Assuming that the coupling efficiency is provided within a range of about −1 dB, a value of d1/d becomes approximately 0.35 (that is to say, 35%) from the lens aperture diameter. Accordingly, it is desirable to limit the value of d1/d to approximately 0.35.

If the effective diameter D of the lens 15=1000 micron and a hole diameter d of the lens aperture =500 micron, a permissible value of the center displacement is 500×0.35 = 175 micron. Taking accuracy in processing and assembling of a usual optical module into consideration, it is possible to understand that no problem is produced.

Next, an actual structure of the lens aperture will be described with reference to FIG. 10.

Figure 10:
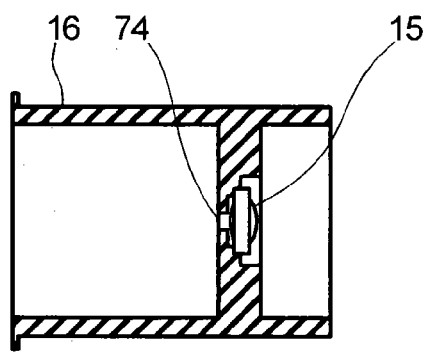
FIG. 10 is an expanded sectional view illustrating a first embodiment of the lens aperture unit shown in FIG. 1.

FIG. 10 is an expanded sectional view illustrating a first embodiment of the lens aperture unit shown in FIG. 1. As shown in the figure, in this embodiment, the lens aperture unit 74 has a structure in which the lens holder 16 having the lens 15 is provided with a lens aperture. Therefore, the lens aperture unit 74 can be easily realized. Here, it is needless to say that a position at which the lens aperture is placed is not limited to immediately before, or immediately after, the lens 15 and accordingly the lens aperture can be placed at an arbitrary position between the LD and the fiber. However, except the case where the lens aperture is placed at the position immediately before, or immediately after, the lens 15, the strict accuracy in alignment of the centers of the lens and the lens aperture must be achieved by making the hole diameter of the lens aperture small. Hence, it is desirable to apply the structure in which the lens aperture is placed at the position immediately before, or immediately after, the lens.

Figure 11:
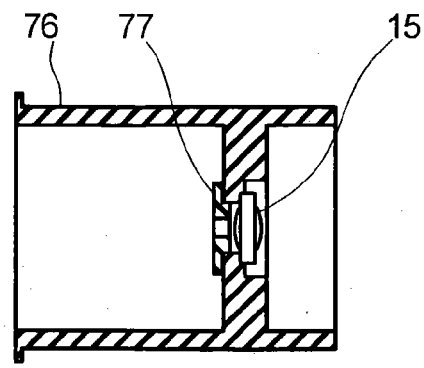
FIG. 11 is a cross section illustrating a second embodiment of a lens aperture unit of an optical module according to the present invention.

FIG. 11 is a cross section illustrating a second embodiment of a lens aperture unit of an optical module according to the present invention. As shown in FIG. 11, a lens aperture component 77 is produced as a separate component, and then the lens aperture component 77 is joined to the LD side of a lens holder 76 having no lens aperture by use of welding, bonding, etc.

Figure 12:
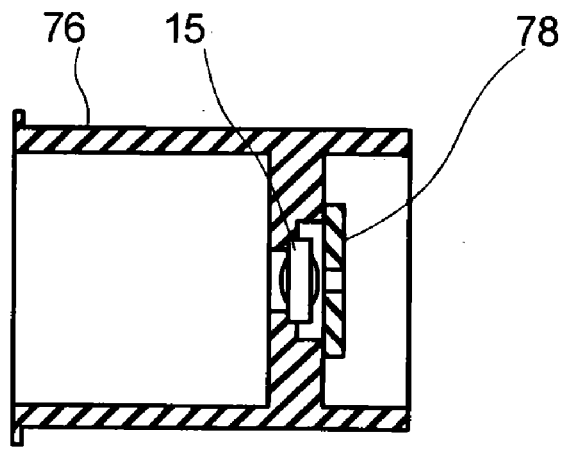
FIG. 12 is a cross section illustrating a third embodiment of a lens aperture unit of an optical module according to the present invention.

FIG. 12 is a cross section illustrating a third embodiment of a lens aperture unit of an optical module according to the present invention. As shown in FIG. 12, the following structure may also be used: producing a lens aperture component 78 as a separate component, and then joining the lens aperture component 78 to the fiber ferrule 51 side of the lens holder 76 having no lens aperture.

Additionally, not the method in which the lens aperture is added to the lens as described above, but a method in which an effective diameter of the lens itself is made small will be described with reference to FIG. 13.

Figure 13:
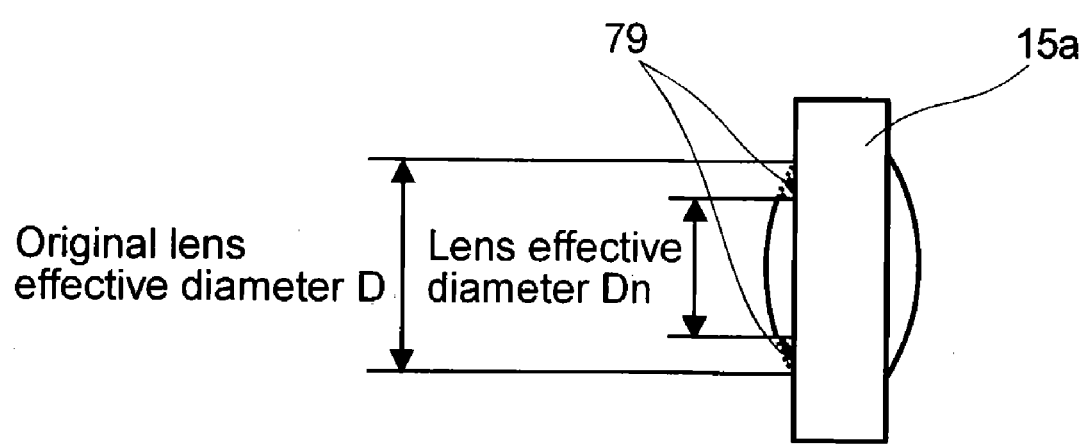
FIG. 13 is a side view illustrating one embodiment of a lens having a lens aperture effect, said lens being used in an optical module according to the present invention.

FIG. 13 is a side view illustrating one embodiment of a lens having a lens aperture effect, said lens being used in an optical module according to the present invention. As shown in the figure, some modifications are made, for example, deleting an outside edge 79 of an incidence plane of the lens 15a, damaging a surface shape, etc. Instead of the incidence plane of the lens 15a, the outside edge 79 of an emittance plane of the lens 15a may also be deleted, or the surface shape may also be damaged. Configuring the lens 15a in this manner eliminates the lens effect around the perimeter of the lens 15a, which produces the same effect as that produced when the lens aperture unit is provided. Thus, this effect is called a lens aperture effect in the present invention. The deletion of the outside edge 79 of the lens produces effects equivalent to those produced when an original lens effective diameter D is reduced to a lens effective diameter Dn. As described above, if a numerical aperture of the lens on the fiber ferrule side =about 0.1, the lens effective diameter D on the fiber side is D=0.2×L2 because NA=0.1=(D/2)/L2. As opposed to this, as described above, in order to produce a lens aperture effect while the numerical aperture NA on the fiber ferrule side of the lens is kept from 0.05 to less than 0.1, the effective diameter Dn on the fiber ferrule side of the lens 15a at 0.1×L2-≦Dn<0.2×L2 should be set. However, as shown in FIG. 3, L2 becomes a distance between an emittance plane of the lens and an incidence plane of the fiber ferrule.

It is needless to say that although this embodiment requires labor and costs to newly produce a metal mold of the lens, effects similar to those produced when the lens aperture is added can be obtained.

Next, a configuration and operation of an optical transmission module (or optical transceiver) using an optical module according to the present invention will be described.

Figure 14:
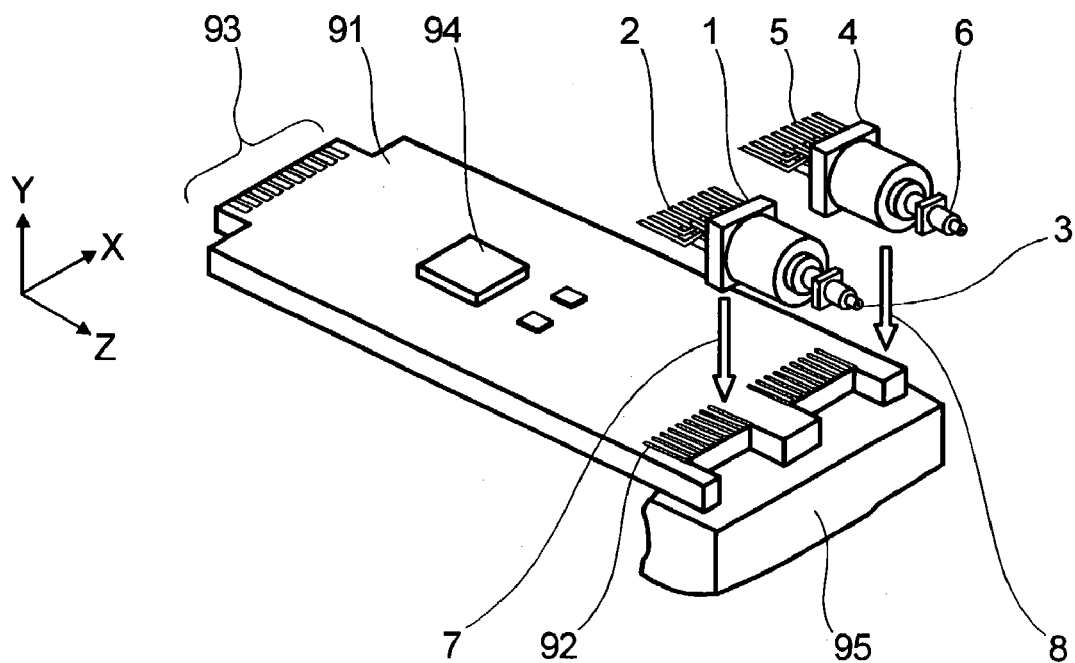
FIG. 14 is a perspective view illustrating one embodiment of an optical transmission module according to the present invention.

FIG. 14 is a perspective view illustrating one embodiment of an optical transmission module according to the present invention, and shows a receptacle-type optical transmission module. A transmission module 1 is separately assembled to have the above-mentioned structure comprising a flat lead terminal 2 (23) and a receptacle-type optical connector 3 (55). A receiver module 4 also comprises a flat lead terminal 5 and a receptacle-type optical connector 6.

To begin with, a printed circuit board 91 is positioned to a fixed unit 95. In this connection, an electric-signal control IC 94, and the like, are mounted on a surface of the printed circuit board 91; and an electric signal is transmitted and received to/from outside the printed circuit board 91 through electric wiring of a card edge part 93. A flat lead terminal 2 of the transmission module 1 is placed over an electrode pad 92 on the printed circuit board 91, and then a lead terminal 2 (23) is secured to the printed circuit board 91 by soldering. In a similar manner, the receiver module 4 is also secured by soldering to the printed circuit board 91 through the lead terminal 5. Here, it is necessary to adjust a positional relation between the electrode pad 92 and the flat lead 2 or 5 so that a position of the receptacle-type optical connector 3 or 6 is kept within a permissible value relative to the printed circuit board 91 at the time of securing each module by soldering.

As far as the optical transmission module is concerned, the assembling tolerance in an optical axis direction is the most lenient. As a result, in an electrical connection part to be connected to the optical module, the quantity of displacement in the optical axis direction becomes large. Because the can type optical module is so devised that leads extend only in an optical axis direction with reference to the printed circuit board 91, it becomes possible to adjust a position of an optical connector on the order of millimeters at a maximum before or after the electrode pad 92 in the optical axis direction. As a result, after separately producing the optical module having a receptacle section, and the printed circuit board, connection of both while adjusting their positional relation becomes possible. This makes it possible to absorb the displacement between the optical transmission and receiver module and the printed circuit board, and thereby assembling becomes possible in a state in which positions of a lead pin and a card edge on an electric signal use connector, and a position of the optical connector, are specified relative to an external form of the optical transceiver.

Figure 15:
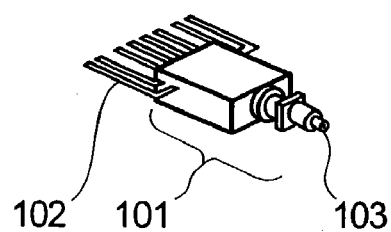
FIG. 15 is a perspective view illustrating one embodiment of a box-type optical module.

Next, a case where a box-type optical module is used will be described with reference to FIG. 15. FIG. 15 is a perspective view illustrating one embodiment of the box-type optical module. As shown in the figure, the box-type optical module means a structure in which a flat lead terminal 102 is connected to a box. Usually the box-type optical module may also be called a butterfly-type optical module. The butterfly-type optical module means a structure made by positioning the optical element (LD) 11 and the lens 15 inside a box-type package to mount them before securing the lens 15 and an optical fiber ferrule 51 to a side of the box. To be more specific, the box-type optical module 101 also has a structure in which the LD 11 and the lens 15 are mounted. The box-type optical module 101 also has a structure comprising a flat lead terminal 102 (23) and a receptacle-type optical connector 103 (55). Accordingly, as is the case with the above-mentioned can type, the box-type optical module 101 can be mounted on the printed circuit board 91. Thus, according to the present invention, it is possible to improve the coupling efficiency that degrades with change in temperature.

As described above, in this embodiment, the degradation in coupling efficiency caused by a change in temperature is improved by providing the lens aperture unit at a position before or after the lens, or by machining an outside edge of the lens so as to prevent light from passing through. Effects produced by machining the outside edge of the lens to prevent light from passing through the outside edge of the lens are the same as those produced by providing the lens itself with a lens aperture unit. Therefore, a case where the lens is machined to produce a lens aperture effect is treated as a case where a lens aperture is provided.

As described above, according to the present invention, for example, in the case of a transmission module, providing a built-in driver IC of the LD inside the optical module makes a size larger, and consequently, even when thermal expansion causes an interval between an optical element and the lens to fluctuate easily, the provision of a lens aperture suppresses fluctuations in light power, making it possible to prevent fluctuations in optical coupling efficiency, etc. from occurring. As a result, it becomes possible to provide an optical module, an optical transmission module (or optical transceiver) that can be produced at low cost.

As described above, according to the present invention, fluctuations in light power can be suppressed, making it possible to prevent fluctuations in optical coupling efficiency from occurring.

What is claimed is:

1. An optical transmission module comprising:
    a base;
    a laser diode which is mounted on a substrate secured to the base;
    a lens holder having a lens for condensing the laser beam, said lens holder being secured to the base; and
    a fiber ferrule having a fiber core into which the laser beam emitted from the lens enters;
    wherein an effective diameter of the lens on the fiber ferrule side is set at a value ranging from 0.1 times to less than 0.2 times of a distance between an emittance plane of the lens and an incidence plane of the fiber ferrule.

2. An optical transmission module according to claim 1 wherein a numerical aperture of the lens on the fiber ferrule side is from 0.05 to less than 0.1.

3. An optical transmission module according to claim 1, further comprising an isolator which can be adjusted by rotating the quantity of light entering into the fiber ferrule, the isolator being placed between the lens and the fiber ferrule.

4. An optical transmission module according to claim 1, wherein the quantity of light entering the fiber ferrule is adjusted in accordance with defocusing by moving the fiber ferrule in an optical axis direction.

5. An optical transmission module according to claim 1, wherein said optical transmission module is configured as a can type optical module by separately placing the lens and the fiber ferrule in an optical axis direction, for the laser diode in the lens holder.

6. An optical transmission module according to claim 1, wherein said optical transmission module has a structure in which an optical module is provided with lead terminals and all of the lead terminals extend in an optical axis direction.

* * * * *